United States Patent
Li et al.

(10) Patent No.: US 9,971,203 B2
(45) Date of Patent: May 15, 2018

(54) DISPLAY SUBSTRATE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jia Li, Beijing (CN); Yu Lu, Beijing (CN); Qingzeng Shan, Beijing (CN); Huibo Zhang, Beijing (CN); Jingang Hao, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 67 days.

(21) Appl. No.: 14/771,403

(22) PCT Filed: Mar. 17, 2015

(86) PCT No.: PCT/CN2015/074349
§ 371 (c)(1),
(2) Date: Aug. 28, 2015

(87) PCT Pub. No.: WO2016/058323
PCT Pub. Date: Apr. 21, 2016

(65) Prior Publication Data
US 2016/0363820 A1 Dec. 15, 2016

(30) Foreign Application Priority Data

Oct. 17, 2014 (CN) .......................... 2014 1 0553332

(51) Int. Cl.
*G02F 1/1337* (2006.01)
*G02F 1/1339* (2006.01)
*G02F 1/1333* (2006.01)

(52) U.S. Cl.
CPC ...... *G02F 1/133784* (2013.01); *G02F 1/1333* (2013.01); *G02F 1/1337* (2013.01);
(Continued)

(58) Field of Classification Search
CPC .................. G02F 1/133784; G02F 1/1337
See application file for complete search history.

(56) References Cited

U.S. PATENT DOCUMENTS 5,365,072 A * 11/1994 Turner ................... G01B 7/004
250/491.1
5,369,050 A * 11/1994 Kawai ............... H01L 21/76251
257/E21.415
(Continued)

FOREIGN PATENT DOCUMENTS

CN 1885116 A 12/2006
CN 1987594 A 6/2007
(Continued)

OTHER PUBLICATIONS

First Office Action regarding Chinese Application No. 201410553332.2 dated Jul. 4, 2016. Translation provided by Dragon Intellectual Property Law Firm.
(Continued)

*Primary Examiner* — Sang V Nguyen
(74) *Attorney, Agent, or Firm* — Harness, Dickey & Pierce, P.L.C.

(57) ABSTRACT

A display substrate and a display device including the display substrate are provided. The display substrate includes an alignment mark in an alignment region of the display substrate; and a blocking structure in a preset region
(Continued)

around the alignment mark, wherein the blocking structure is arranged to block residual particles carried by a rubbing roller during rubbing.

10 Claims, 7 Drawing Sheets

(52) U.S. Cl.
CPC ............... *G02F 1/1339* (2013.01); *G02F 2001/133354* (2013.01); *G02F 2201/501* (2013.01); *G02F 2201/56* (2013.01)

(56) References Cited

U.S. PATENT DOCUMENTS

| | | | | |
|---|---|---|---|---|
| 5,701,013 | A * | 12/1997 | Hsia ............... | G01Q 40/02 250/491.1 |
| 6,930,745 | B1 * | 8/2005 | Miyazaki ........ | G02F 1/1339 349/152 |
| 2003/0223030 | A1 * | 12/2003 | Byun ............... | G02F 1/1303 349/187 |
| 2004/0263769 | A1 * | 12/2004 | Lee ................. | G02F 1/1333 349/187 |
| 2007/0064188 | A1 * | 3/2007 | Okamoto ........ | G02F 1/1333 349/135 |
| 2008/0129946 | A1 * | 6/2008 | Chan ............... | G02F 1/1339 349/153 |
| 2010/0149477 | A1 * | 6/2010 | Nagami ........... | G02F 1/1339 349/138 |
| 2012/0287357 | A1 * | 11/2012 | Misaki ............ | G02F 1/13338 349/12 |

FOREIGN PATENT DOCUMENTS

| | | | | |
|---|---|---|---|---|
| CN | 102692831 | A | | 9/2012 |
| CN | 102707486 | A | | 10/2012 |
| CN | 102713737 | A | | 10/2012 |
| CN | 104062783 | A | | 9/2014 |
| CN | 104267544 | A | | 1/2015 |
| JP | 08-006005 | | * 1/1996 | ........... G02F 1/1335 |
| JP | 2005-115037 | | * 4/2005 | ........... G02F 1/1337 |
| JP | 2005115037 | A | | 4/2005 |
| WO | WO 2013177874 | | * 12/2013 | ........... G03F 9/7076 |

OTHER PUBLICATIONS

Written Opinion of the International Searching Authority regarding International Application No. PCT/CN2015/074349. Translation provided by Dragon Intellectual Property Law Firm.

Fourth Chinese Office Action regarding Application No. 201410553332.2 dated Jan. 10, 2018. Translation provided by Dragon Intellectual Property Law Firm.

* cited by examiner

US 9,971,203 B2

DISPLAY SUBSTRATE AND DISPLAY DEVICE

CROSS REFERENCE TO RELATED APPLICATION

This application is the U.S. national phase of PCT Application No. PCT/CN2015/074349 filed on Mar. 17, 2015, which claims a priority of the Chinese Patent Application No. 201410553332.2 filed on Oct. 17, 2014, the disclosures of which are incorporated in their entirety by reference herein.

TECHNICAL FIELD

The present invention relates to the field of display technology, and in particular to a display substrate and a display device having the same.

BACKGROUND

A Thin Film Transistor Liquid Crystal Display (TFT-LCD) is formed by arranging a Thin Film Transistor (TFT) array substrate and a Color Filter (CF) substrate oppositely to form a cell, with liquid crystals being filled between the TFT substrate and the CF substrate. To output different image, the liquid crystals are driven to rotate by controlling a variation of a voltage on the TFT substrate. In a cell-forming process, one of the most important steps is a cell alignment step, i.e., arranging the TFT substrate and the CF substrate oppositely to from a cell within a preset accuracy range in accordance with design requirements. Reference is made to FIG. 1, which is a schematic diagram of cell alignment of a TFT substrate 101 and a CF substrate 102. In the process of the cell alignment, the most important factor is an alignment mark 103 for the cell alignment. If the alignment mark 103 goes wrong, for example, a zigzag residue is formed at an edge of the alignment mark during rubbing of the TFT substrate due to the stacking of small residual particles on the TFT substrate, then the cell alignment cannot be achieved accurately, thereby resulting in various defects of the TFT-LCD, such as Mura defects and Zara defects.

SUMMARY

In view of the above, the present invention provides a display substrate and a display device including the display substrate, for solving the problem that the display substrate cannot be aligned accurately due to a zigzag residue which is formed at an edge of the alignment mark during rubbing of the display substrate due to the stacking of small residual particles on the display substrate.

The disclosure provides in an embodiment a display substrate, including an alignment mark in an alignment region of the display substrate; and a blocking structure in a preset region around the alignment mark, wherein the blocking structure is arranged to block residual particles carried by a rubbing roller during rubbing.

Alternatively, the blocking structure may have a gully-shape.

Alternatively, the blocking structure may include a plurality of line-shaped projections arranged in parallel and at intervals.

Alternatively, the blocking structure may further include a rectangular block projection surrounding the alignment mark, and the line-shape projections may be arranged within the rectangular block projection.

Alternatively, lengths of the plurality of line-shaped projections may be reduced gradually in a direction from a point away from the alignment mark to a point near to the alignment mark.

Alternatively, an extension direction of the line-shaped projection may be at a preset angle relative to a travel direction of the rubbing roller.

Alternatively, the extension direction of the line-shaped projection may be perpendicular to the travel direction of the rubbing roller.

Alternatively, the blocking structure may include a plurality of annular projections arranged concentrically, and the alignment mark may be located at a center of the plurality of annular projections.

Alternatively, the different alignment mark may correspond to the different number of annular projections.

Alternatively, the different alignment mark may correspond to the same number of annular projections.

Alternatively, the blocking structure may include a plurality of zigzag projections arranged at intervals.

Alternatively, the blocking structure may have a same film layer structure with the alignment mark.

Alternatively, the blocking structure may include at least one metal layer and an insulating layer for covering the metal layer.

The present disclosure further provides in an embodiment a display device including the display substrate described above.

The above technical solutions of the present disclosure have following benefit effects.

The blocking structure is formed in the preset region around the alignment mark. Small particles such as residual ITO particles carried by the rubbing roller during the rubbing process can be stacked in the blocking structure, thereby not affecting the profile of the alignment mark, so as to avoid the problems such as alignment blur and alignment offset due to the variation of the profile of the alignment mark. Thus, the alignment mark can be identified by the device successfully, and the cell alignment between the display substrates can be achieved, thereby improving stability and efficiency of the production and saving the cost.

DETAILED DESCRIPTION

To illustrate the technical problems, technical solutions and advantages of the present disclosure more clearly, the technical solutions in the embodiments of the present disclosure will be described in detail hereinafter in conjunction with the drawings and the embodiments of the present disclosure.

Figure 1:
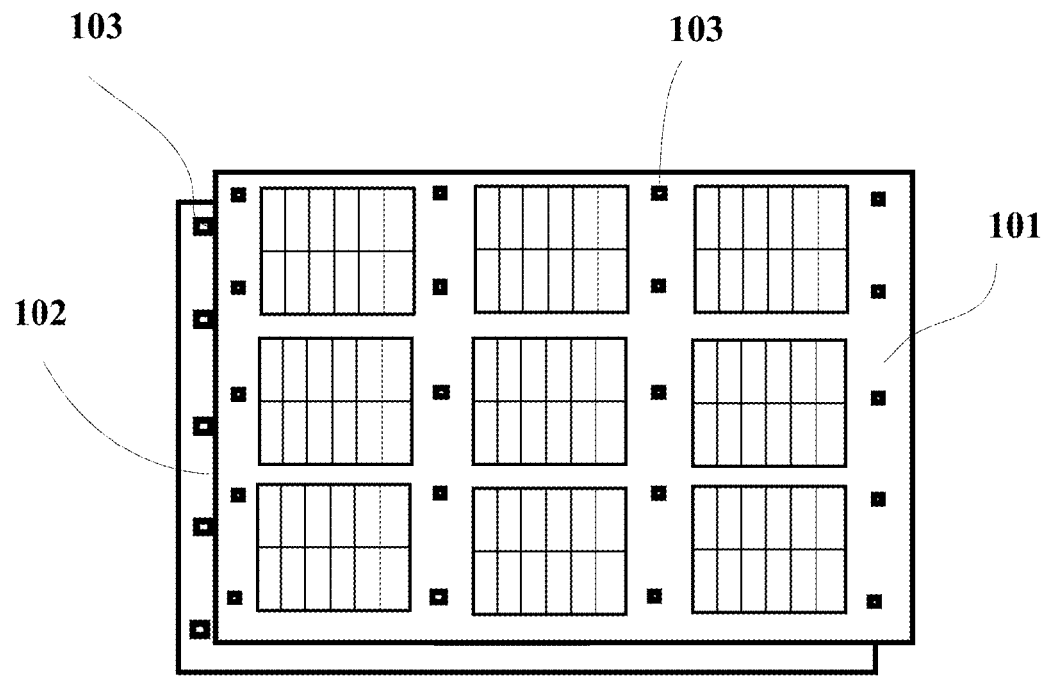
FIG. 1 is a schematic diagram of distribution of alignment marks on a TFT substrate and a CF substrate in the conventional art.
Figure 2:
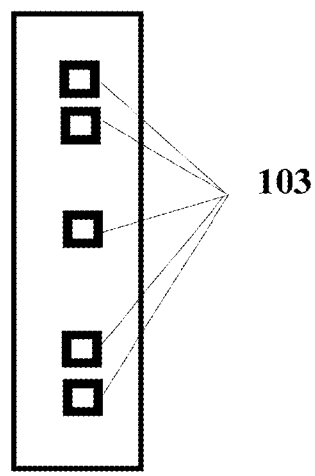
FIG. 2 is an enlarged top view of alignment marks on a TFT substrate in the conventional art.
Figure 3:
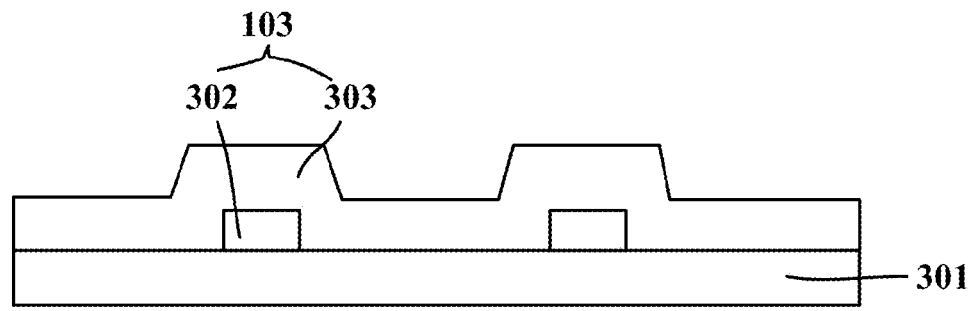
FIG. 3 is a schematic sectional view of alignment marks without residual particles on a TFT substrate in an ideal production circumstance.
Figure 4:
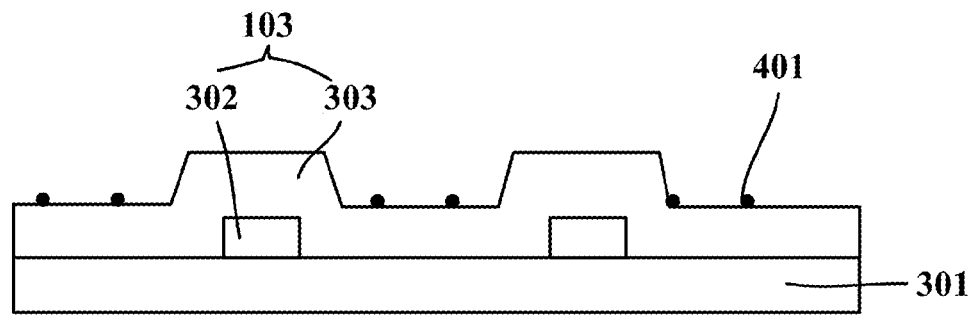
FIG. 4 is a schematic sectional view of alignment marks with residual particles on a TFT substrate.

During a fabricating process of a TFT substrate, an Indium Tin Oxide (ITO) film layer is formed firstly to form an uppermost ITO electrode. Next, in a region without any circuit pattern, the ITO film layer is etched. However, the ITO film layer cannot be etched completely in a practical process, and small particles are remained, which is generally referred as ITO Remain. Referring to FIGS. 2 to 4, FIG. 2 is a top view of alignment marks on a TFT substrate in the conventional art; and FIG. 3 is a schematic sectional view of alignment marks without residual particles in an ideal production circumstance. The alignment mark 103 generally includes a metal layer 302 on a base 301 and an insulating layer 303. The metal layer 302 is generally formed at the same time with a gate metal layer or a source/drain metal layer of the TFT. FIG. 4 is a schematic sectional view of alignment marks with residual particles in a practical fabricating circumstance. In FIG. 4, the small residual ITO particles are denoted by 401.

Figure 5:
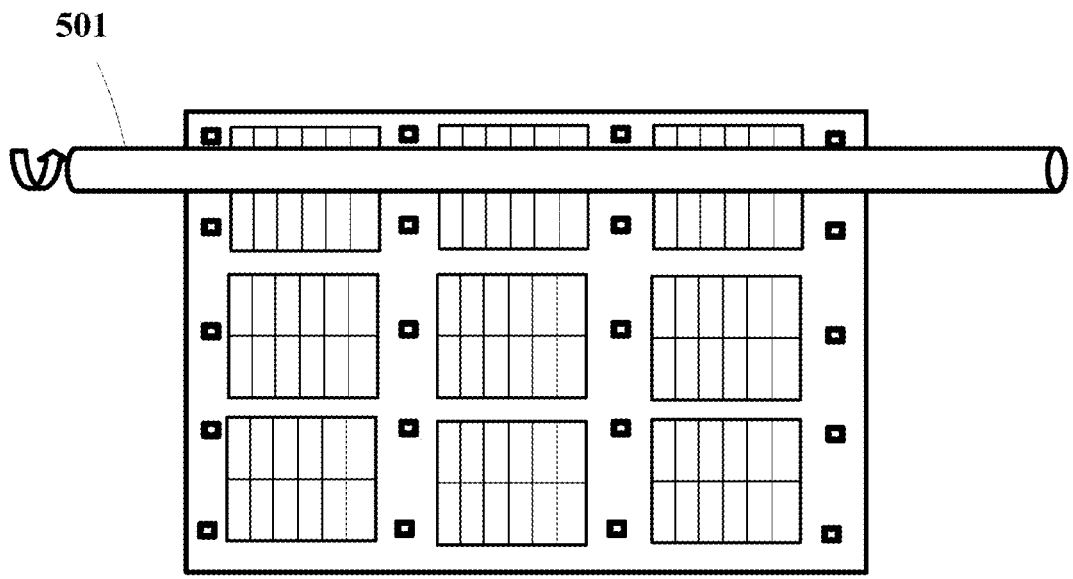
FIG. 5 is a schematic diagram of a rubbing process.
Figure 6:
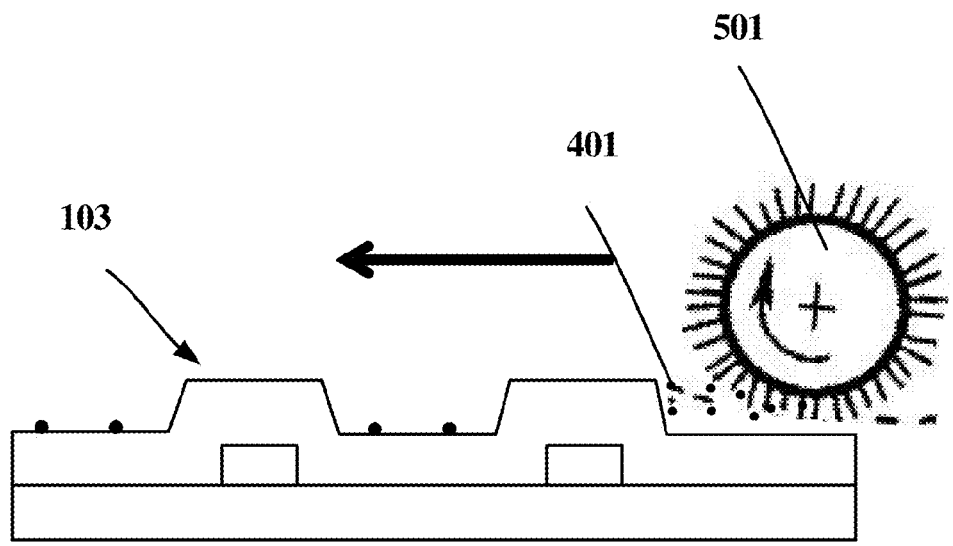
FIG. 6 is a schematic diagram of a process of stacking residual ITO particles during rubbing.
Figure 7:
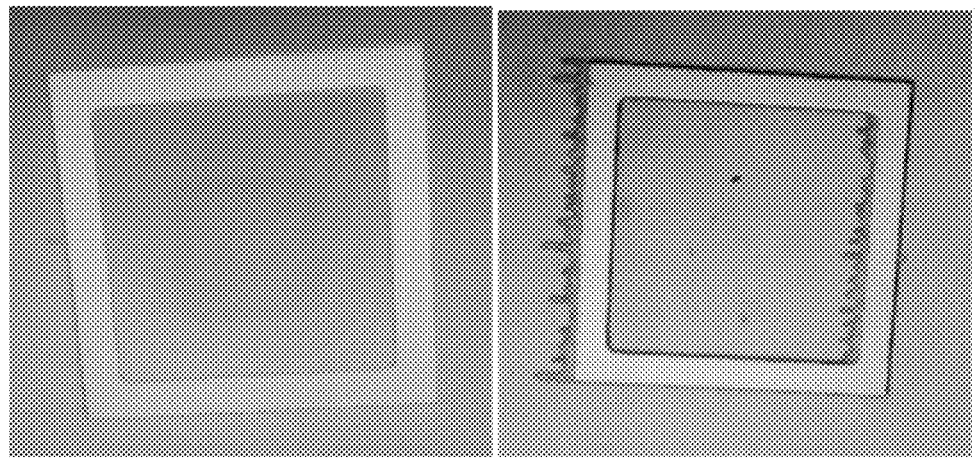
FIG. 7 is a schematic diagram of a comparison between a normal alignment mark (on the left) and an alignment mark with zigzag residues.

A cell alignment process mainly includes: 1) coating with an alignment film; 2) cell alignment; and 3) liquid crystal injection. During the process of coating with an alignment film, a rubbing process is performed. That is, alignment films are aligned by a rubbing cloth on a rubbing roller, so that the alignment films conform to an initial arrangement of liquid crystals. A schematic diagram of rubbing is shown in FIG. 5. In FIG. 5, the rubbing roller is denoted by 501, and a rolling direction of rubbing roller 501 is denoted by the arrow. Since small ITO particles are remained during the fabricating of the TFT substrate, the ITO particles may be stacked at a stage of the FTF substrate (an edge of the alignment mark 103), thereby forming zigzag residues on the edge of the alignment mark 103. The process of stacking residual ITO particles is shown in FIG. 6. In FIG. 7, a normal alignment mark in an ideal production circumstance is shown on the left, and an alignment mark with zigzag residues is shown on the right.

During the alignment, the zigzag residues on the edges of the alignment mark cannot be recognized by the machine, resulting in alignment blur or alignment offset, and affecting the fabrication and products badly.

To solve the problem in the conventional art that the display substrate cannot be aligned accurately during rubbing of the display substrate due to stacking of small residual particles on the display substrate, the present invention provides a display substrate, which includes an alignment mark in an alignment region of the display substrate; and a blocking structure in a preset region around the alignment mark, wherein the blocking structure is arranged to block residual particles carried by a rubbing roller during rubbing.

The preset region around the alignment mark may be a region around the alignment mark through which the rubbing roller travels during the rubbing. It should be noted that, the preset region around the alignment mark is not limited to the region around the alignment mark through which the rubbing boll travels during the rubbing, and the blocking structure may be arranged anywhere around the alignment mark, and can function to block no matter the rubbing boll travels the region or not.

Since the blocking structure is formed in the preset region around the alignment mark, the particles such as residual ITO particles carried by the rubbing roller during the rubbing process can be stacked in the blocking structure, thereby affecting the profile of the alignment mark, so as to avoid the problems such as alignment blur and alignment offset due to the variation of the profile of the alignment mark. Thus, the alignment mark can be identified by the device successfully, and the cell alignment between the display substrates can be achieved, thereby improving stability and efficiency of the production and saving the cost.

The blocking structure may be formed at the same time with the film layer on the display substrate, for reducing the cost. Alternatively, the blocking structure may be fabricated separately.

The blocking structure may have a same film layer structure with the alignment mark, for further reducing the fabrication cost. Alternatively, the blocking structure may have a different film layer structure from the alignment mark.

The alignment mark is generally formed by a metal layer and an insulating layer for covering the metal layer. For example, if the display substrate is an array substrate, the metal layer may be formed at the same time with a gate metal layer or a source-drain metal layer of the array substrate. The insulating layer may be formed at the same time with a passivation layer of the array substrate or other insulating layers. As mentioned above, the blocking structure may have a same film layer structure with the alignment mark, i.e., the blocking structure may include a metal layer and an insulating layer for covering the metal layer. Alternatively, the blocking structure may include multiple metal layers and multiple insulating layers.

In an embodiment of the present disclosure, the blocking structure has no influence on the circuit, the display region and the alignment marks on the display substrate, so the cost is low.

Figure 8:
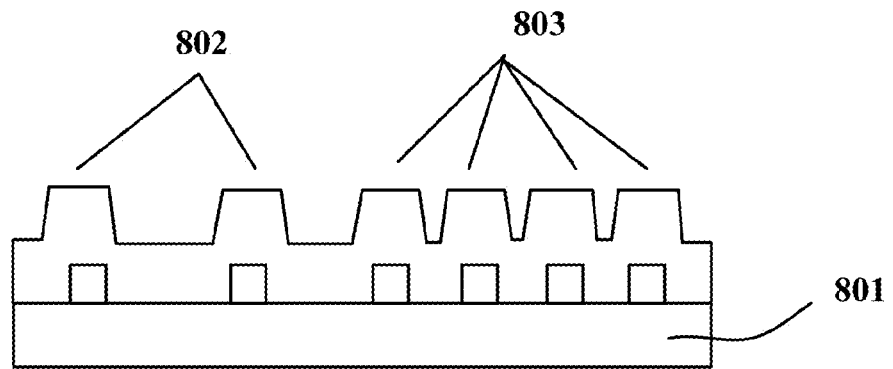
FIG. 8 is a sectional view of a display substrate according to an embodiment of the present disclosure.

Reference is made to FIG. 8, which is a schematic sectional view of a display substrate according to an embodiment of the present disclosure. The display substrate includes: a base substrate 801, an alignment mark 802 in an alignment region of the base substrate 801, and a blocking structure 803 in a preset region around the alignment mark 802, wherein the blocking structure 803 has a gully-shape.

Figure 9:
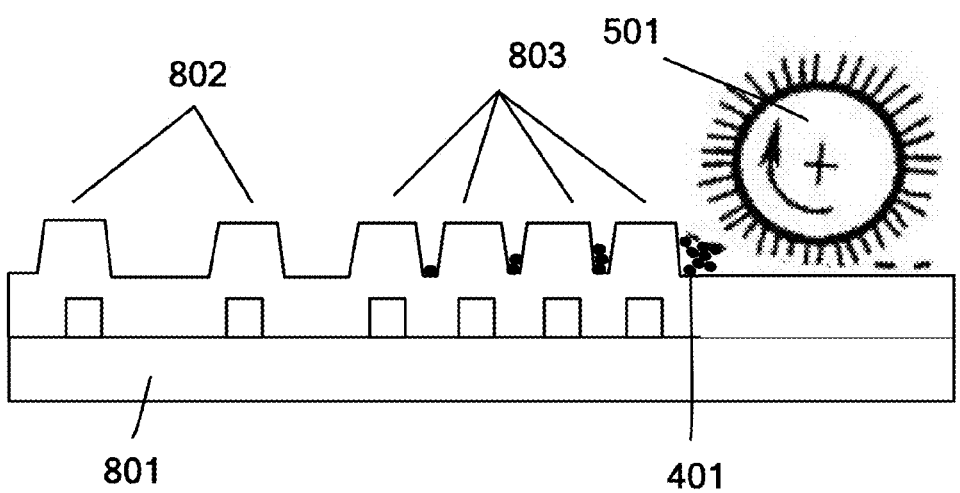
FIG. 9 is a schematic diagram showing blocking effects of a blocking structure for blocking small residual particles according to an embodiment of the present disclosure.

Reference is made to FIG. 9, which is a schematic diagram showing blocking effects of a blocking structure according to an embodiment of the present disclosure. As can be seen from FIG. 9, during the rubbing of the rubbing roller, the small ITO particles 401 carried by the rubbing roller are blocked in the gully of the blocking structure 803 previously without being stacked at the edge of the alignment mark 802, thereby having no influence on the profile of the alignment mark, and avoiding the problems such as alignment blur or alignment offset due to the variation of the profile of the alignment mark.

In an embodiment of the present disclosure, the blocking structure is arranged to block the small residual ITO particles. Obviously, the blocking structure can also block other small particles on the display substrate.

In an embodiment of the present disclosure, the display substrate may be an array substrate, or a color film substrate, or other types of display substrates.

Details of the blocking structure will be illustrated hereinafter.

Figure 10:
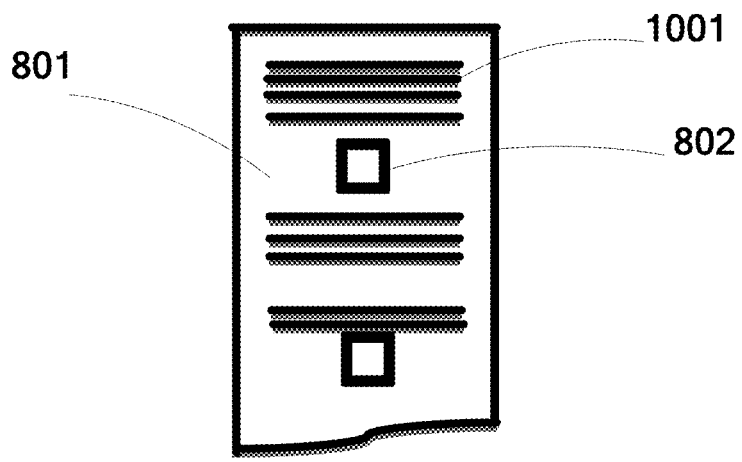
FIG. 10 is a top view of a blocking structure according to a first embodiment of the present disclosure.

Reference is made to FIG. 10, which is a top view of a blocking structure according to a first embodiment of the present disclosure. The blocking structure includes multiple line-shaped projections 1001 arranged in parallel and at intervals.

Figure 11:
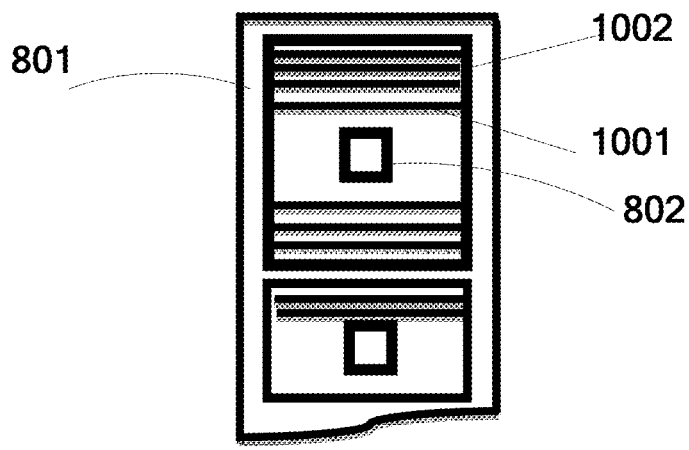
FIG. 11 is a top view of a blocking structure according to a second embodiment of the present disclosure.

Reference is made to FIG. 11, which is a top view of a blocking structure according to a second embodiment of the present disclosure. The blocking structure includes multiple line-shaped projections 1001 arranged in parallel and at intervals and a rectangular block projection 1002 surrounding the alignment mark, and the line-shape projections 1001 may be arranged within the rectangular block projection 1002.

Figure 12:
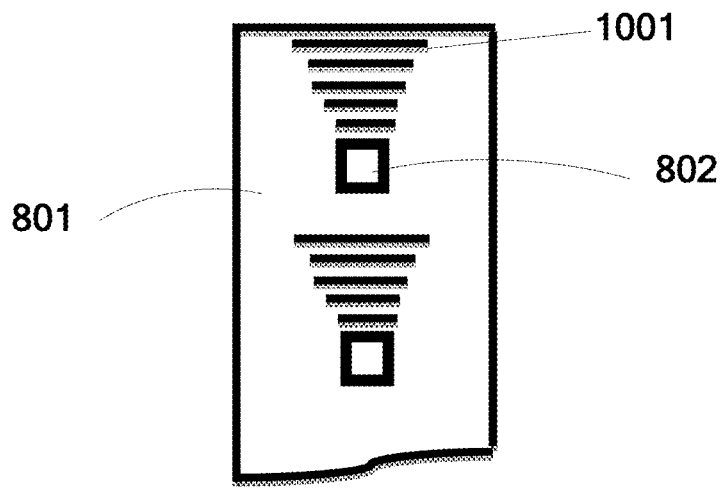
FIG. 12 is a top view of a blocking structure according to a third embodiment of the present disclosure.

Reference is made to FIG. 12, which is a top view of a blocking structure according to a third embodiment of the present disclosure. The blocking structure includes multiple line-shaped projections 1001 arranged in parallel and at intervals, and lengths of the multiple line-shaped projections 1001 are reduced gradually in a direction from a point away from the alignment mark to a point near to the alignment mark.

In the above embodiments, distances between the projections 1001 may be equal or not equal to each other.

In the above embodiments, an extension direction of the line-shaped projection 1001 is perpendicular to a travel direction of the rubbing roller. Obviously, in other embodiments of the present disclosure, the extension direction of the line-shaped projection 1001 may not be perpendicular to a travel direction of the rubbing roller. For example, the extension direction of the line-shaped projection 1001 may be at a preset angle relative to the travel direction of the rubbing roller.

Figure 13:
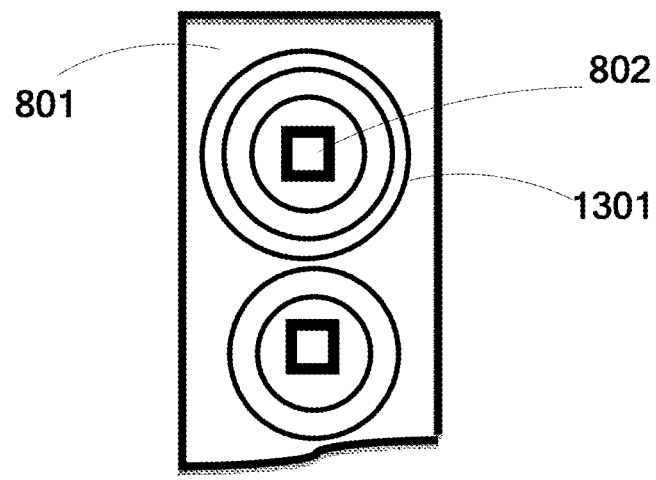
FIG. 13 is a top view of a blocking structure according to a fourth embodiment of the present disclosure.

Reference is made to FIG. 13, which is a top view of a blocking structure according to a fourth embodiment of the present disclosure. The blocking structure includes a plurality of annular projections 1301 arranged concentrically, and the alignment mark is located at a center of the plurality of annular projections 1301.

In an embodiment of the present disclosure, different alignment marks may correspond to the different numbers of annular projections, or different alignments mark may correspond to the same number of annular projections.

Figure 14:
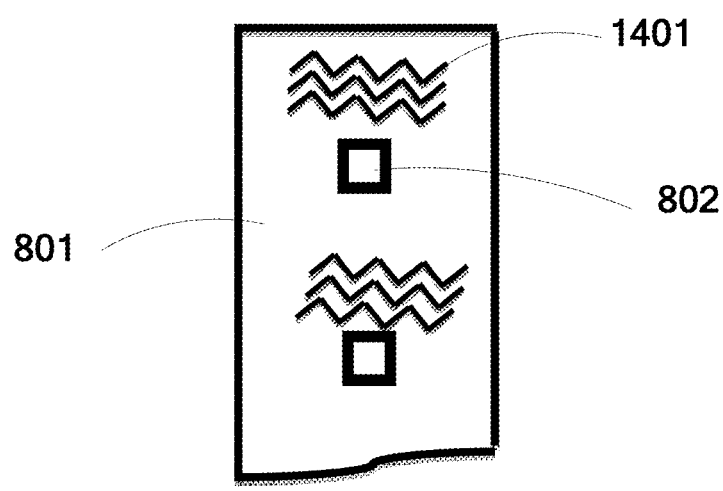
FIG. 14 is a top view of a blocking structure according to a fifth embodiment of the present disclosure.

Reference is made to FIG. 14, which is a top view of a blocking structure according to a fifth embodiment of the present disclosure. The blocking structure includes a plurality of zigzag projections 1401 arranged at intervals.

Obviously, in other embodiments of the present disclosure, the blocking structure may have other profiles, which are not listed here one by one.

An embodiment of the present disclosure further provides a display device including the display substrate according to any one of the above embodiments.

The above are only embodiments of the present disclosure. It should be noted that, several modifications and improvements may be made by those skilled in the art without deviating from the principle of the present disclosure, and these modifications and improvements shall also be considered to fall within the scope of protection of the present disclosure.

What is claimed is:

1. A display substrate, comprising:
an alignment mark in an alignment region of the display substrate; and
a blocking structure in a preset region around the alignment mark, wherein the blocking structure is arranged to block residual particles carried by a rubbing roller during rubbing,
wherein the blocking structure has a gully-shape and comprises a plurality of line-shaped projections arranged in parallel and at intervals,
wherein lengths of the plurality of line-shaped projections are reduced gradually in a direction from a point away from the alignment mark to a point near to the alignment mark, and
wherein intervals between each two directly adjacent projections are not all equal to each other and each two directly adjacent projections are separated from, and not connected to, each other, and parallel to an edge of the alignment mark.

2. The display substrate according to claim 1, wherein the blocking structure further comprises a rectangular block projection surrounding the alignment mark, and the line-shape projections are arranged within the rectangular block projection.

3. The display substrate according to claim 1, wherein an extension direction of the line-shaped projection is at a preset angle relative to a travel direction of the rubbing roller.

4. The display substrate according to claim 3, wherein the extension direction of the line-shaped projection is perpendicular to the travel direction of the rubbing roller.

5. The display substrate according to claim 1, wherein the blocking structure has a same film layer structure with the alignment mark.

6. The display substrate according to claim 5, wherein the blocking structure comprises at least one metal layer and an insulating layer for covering the metal layer.

7. A display device, comprising the display substrate according to claim 1.

8. The display substrate according to claim 2, wherein the blocking structure has a same film layer structure with the alignment mark.

9. The display substrate according to claim 3, wherein the blocking structure has a same film layer structure with the alignment mark.

10. The display substrate according to claim 4, wherein the blocking structure has a same film layer structure with the alignment mark.

* * * * *